US012439160B2

(12) United States Patent
Toyoda

(10) Patent No.: US 12,439,160 B2
(45) Date of Patent: Oct. 7, 2025

(54) INFORMATION PROCESSING APPARATUS HAVING IMAGE RANGE OF IMAGING APPARATUS CHANGED BY CONTROLLING AT LEAST ONE OF PAN, TILT, AND ZOOM, INFORMATION PROCESSING METHOD, AND STORAGE MEDIUM

(71) Applicant: CANON KABUSHIKI KAISHA, Tokyo (JP)

(72) Inventor: Takuya Toyoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 18/049,425

(22) Filed: Oct. 25, 2022

(65) Prior Publication Data
US 2023/0129756 A1  Apr. 27, 2023

(30) Foreign Application Priority Data

Oct. 26, 2021 (JP) .................................. 2021-174453

(51) Int. Cl.
*H04N 23/695* (2023.01)
*H04N 23/63* (2023.01)
*H04N 23/69* (2023.01)

(52) U.S. Cl.
CPC ......... *H04N 23/695* (2023.01); *H04N 23/633* (2023.01); *H04N 23/69* (2023.01)

(58) Field of Classification Search
CPC ........ G08B 13/19643; G08B 13/19608; H04N 7/181; H04N 23/90; H04N 23/662; H04N 23/695; H04N 23/633; H04N 23/69; H04N 17/002; H04N 23/698; G06T 7/254
See application file for complete search history.

(56) References Cited

U.S. PATENT DOCUMENTS

| | | | | |
|---|---|---|---|---|
| 6,215,519 B1* | 4/2001 | Nayar | ............. | G08B 13/19608 |
| | | | | 348/E7.086 |
| 7,990,422 B2* | 8/2011 | Ahiska | ............. | G08B 13/19643 |
| | | | | 348/211.3 |
| 8,488,001 B2* | 7/2013 | Mohanty | .......... | G08B 13/19643 |
| | | | | 348/143 |
| 11,638,071 B2* | 4/2023 | Gong | ................... | H04N 23/698 |
| | | | | 348/345 |
| 2002/0024599 A1* | 2/2002 | Fukuhara | ............. | G01S 3/7864 |
| | | | | 348/172 |

(Continued)

FOREIGN PATENT DOCUMENTS

JP  2008103890 A  5/2008
JP  2019062279 A  4/2019

*Primary Examiner* — Timothy J Henn
(74) *Attorney, Agent, or Firm* — Canon U.S.A., Inc. IP Division

(57) ABSTRACT

An information processing apparatus acquires association information for associating an imaging range of a first imaging apparatus with an imaging range of a second imaging apparatus configured to change the imaging range by controlling at least one of pan, tilt, and zoom. In addition, the information processing apparatus determines whether a change in a position of a subject that is derived based on a position of the subject detected from a first image captured by the first imaging apparatus and the association information, and a change in the position of the subject on the first image satisfy a predetermined condition.

8 Claims, 8 Drawing Sheets

(56) References Cited

U.S. PATENT DOCUMENTS

| | | | | |
|---|---|---|---|---|
| 2006/0012681 A1* | 1/2006 | Fujii | .................... | H04N 7/181 |
| | | | | 348/E7.086 |
| 2010/0265331 A1* | 10/2010 | Tanaka | ............. | G08B 13/19673 |
| | | | | 348/36 |
| 2011/0310219 A1* | 12/2011 | Kim | ..................... | H04N 7/188 |
| | | | | 348/36 |
| 2019/0066335 A1* | 2/2019 | Dahlström | ............ | H04N 17/002 |
| 2024/0056686 A1* | 2/2024 | Tsunashima | ............ | H04N 23/61 |

* cited by examiner

FIG.8

| MOVING SPEED | LOW | NORMAL | HIGH |
|---|---|---|---|
| THRESHOLD IN x DIRECTION | $\varepsilon_{x1}$ | $\varepsilon_{x2}$ | $\varepsilon_{x3}$ |
| THRESHOLD IN y DIRECTION | $\varepsilon_{y1}$ | $\varepsilon_{y2}$ | $\varepsilon_{y3}$ |

801

802

$\varepsilon_{x1} < \varepsilon_{x2} < \varepsilon_{x3}$ $\varepsilon_{y1} < \varepsilon_{y2} < \varepsilon_{y3}$

INFORMATION PROCESSING APPARATUS HAVING IMAGE RANGE OF IMAGING APPARATUS CHANGED BY CONTROLLING AT LEAST ONE OF PAN, TILT, AND ZOOM, INFORMATION PROCESSING METHOD, AND STORAGE MEDIUM

BACKGROUND

Technical Field

One disclosed aspect of the embodiments relates to an information processing technique applicable to an imaging system that tracks a subject.

Description of the Related Art

There has been a growing demand for automatically capturing images of dynamic scenes such as a lecture and a sport scene using a remote camera in recent years. As a technique for achieving the automatic imaging, there has been known a technique for automatically tracking a subject by performing pan, tilt, and zoom (hereinafter referred to as PTZ) control on a camera to adjust an imaging range based on a movement of the subject. If a subject captured in a large size within a screen moves fast, the tracking by the PTZ control can fail to keep up with the movement and the subject can be lost track of, i.e., go out of the angle of view of the camera. A method for continuing the imaging in such a case is to adjust the angle of view to a preset wider one so that the subject falls within the angle of view. Such a method, however, is not capable of capturing an image of the subject during the operation of adjusting the angle of view to the preset one. Moreover, even when the angle of view is adjusted to the preset one, the imaging is unable to be resumed if the subject is outside the preset angle of view at that point in time.

Japanese Patent Application Laid-Open No. 2008-103890 discusses a technique where if a tracking target is lost track of or likely to be lost track of, a feature amount acquired from the image is used to search for the tracking target based on a captured image of an adjacent camera to which the tracking target is predicted to move, and the adjacent camera captures the tracking target. However, the technique described in Japanese Patent Application Laid-Open No. 2008-103890 is intended solely to hand over the subject between the adjacent cameras, and unable to return the camera having lost track of the subject to the tracking state if the adjacent camera is unable to detect the subject and fails in tracking the subject.

Aside from the foregoing method using the preset angle of view and the method discussed in Japanese Patent Application Laid-Open No. 2008-103890, there is a calibration information-based method as the method capable of restoring the tracking of the lost subject. More specifically, PTZ control is performed on a camera having lost track of the subject to restore the tracking of the subject, based on calibration information acquired by performing a calibration in advance to associate the imaging ranges of a plurality of cameras with each other and a subject position acquired by a camera successfully tracking the subject. However, since the calibration is performed by the user manually associating the imaging ranges of the cameras, the calibration itself can be incorrect. If the calibration itself is incorrect, the PTZ control based on the calibration information is also inaccurate and can be performed deviating from the movement of the tracking target.

SUMMARY

One disclosed aspect of the embodiments is directed to enabling a determination of whether there is an error in a calibration associating imaging ranges.

According to an aspect of the disclosure, an information processing apparatus comprises a computer configured to execute instructions which, when executed by the computer, cause the information processing apparatus to acquire association information for associating an imaging range of a first imaging apparatus with an imaging range of a second imaging apparatus configured to change the imaging range by controlling at least one of pan, tilt, and zoom. The instructions cause the information processing apparatus to determine whether a change in a position of a subject that is derived based on a position of the subject detected from a first image captured by the first imaging apparatus and the association information, and a change in the position of the subject on the first image satisfy a predetermined condition.

Further features of the disclosure will become apparent from the following description of exemplary embodiments with reference to the attached drawings.

BRIEF DESCRIPTION OF THE DRAWINGS

FIG. 8 is an explanatory diagram of determination of thresholds for use in calibration error determination.

DESCRIPTION OF THE EMBODIMENTS

Figure 1:
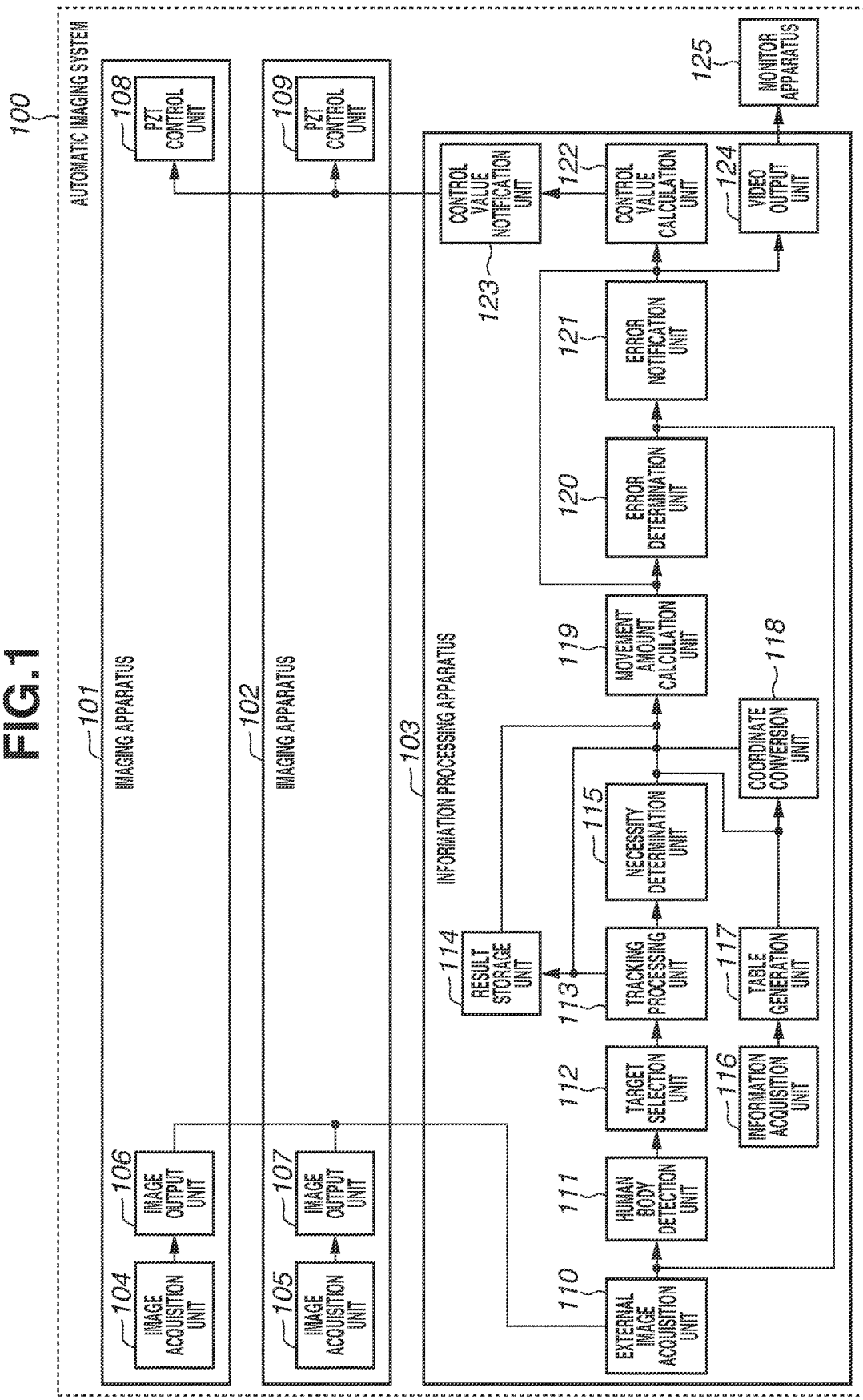
FIG. 1 is a block diagram of an automatic imaging system according to a first exemplary embodiment.

Exemplary embodiments of the disclosure will be described below with reference to the drawings. Configurations described in the following exemplary embodiments are merely examples, and the disclosure is not limited to the illustrated configurations. In the following exemplary embodiments, similar components and processing will be described with the same reference numerals. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Figure 2:
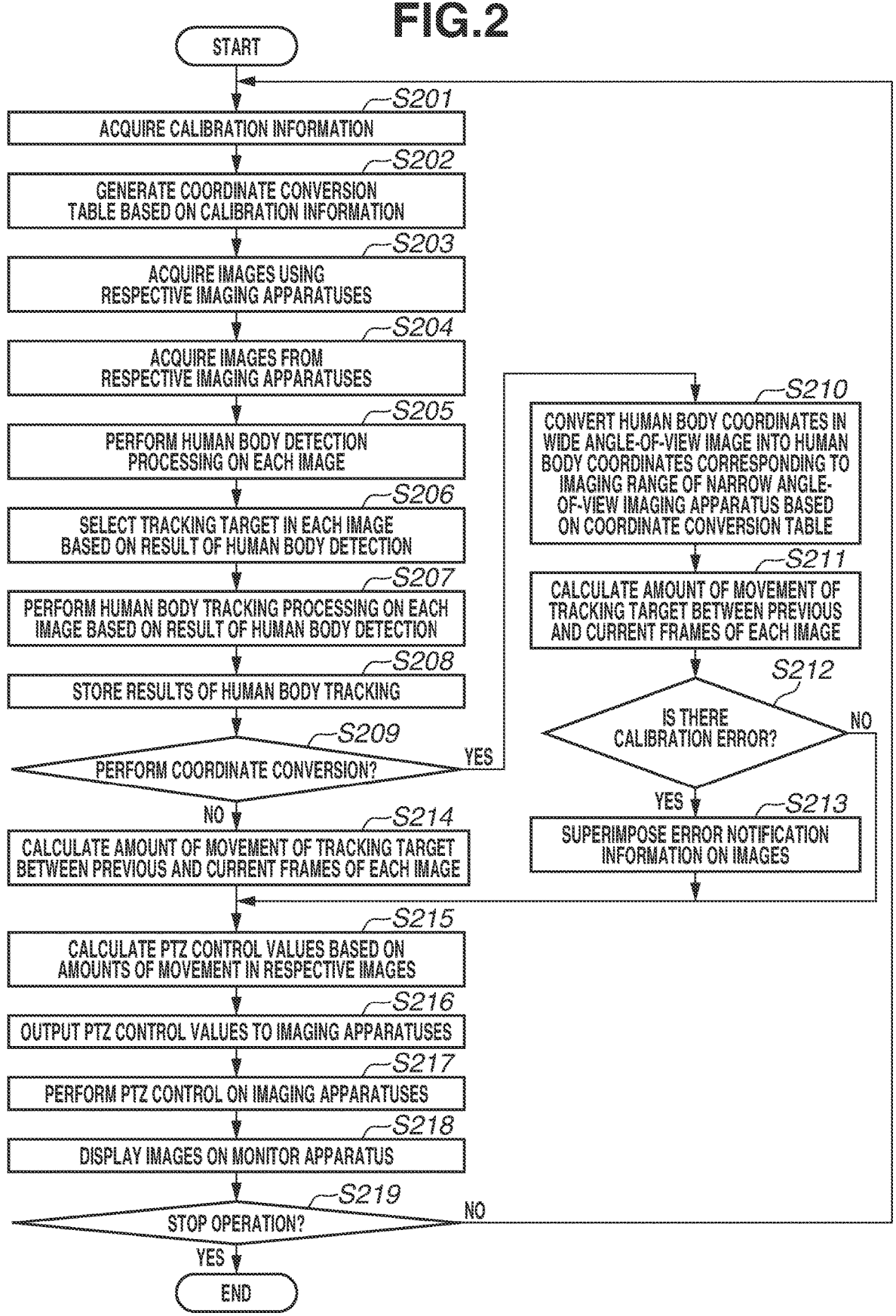
FIG. 2 is a flowchart illustrating a procedure for automatic imaging processing according to the first exemplary embodiment.

FIG. 1 is a diagram illustrating a functional configuration of an automatic imaging system 100 including an information processing apparatus 103 according to a first exemplary embodiment. FIG. 2 is a flowchart illustrating a processing procedure performed by the automatic imaging system 100 according to the present exemplary embodiment. Details of the processing in the flowchart of FIG. 2 will be described below.

The automatic imaging system 100 according to the present exemplary embodiment includes an imaging apparatus 102 (a first imaging apparatus), an imaging apparatus 101 (a second imaging apparatus), the information processing apparatus 103, and a monitor apparatus 125. The imaging apparatuses 101 and 102 are connected to the information processing apparatus 103 via a network. The information processing apparatus 103 is connected to the monitor apparatus 125 via a video interface. While the automatic imaging system 100 illustrated in FIG. 1 includes the two imaging apparatuses 101 and 102, the automatic imaging system 100 may include more imaging apparatuses and these imaging apparatuses may be connected to the information processing apparatus 103.

Each of the imaging apparatus 102 (the first imaging apparatus) and the imaging apparatus 101 (the second imaging apparatus) is configured to capture an image of the surroundings to generate captured image data, and includes a camera unit having a zoom function and a motor-driven panhead unit capable of pan and tilt driving. In other words, the imaging apparatuses 101 and 102 are capable of pan, tilt, and zoom (PTZ) driving independently of each other, and each can individually adjust an imaging range. As used herein, the imaging range refers to a range determined by the imaging direction of an imaging apparatus and the magnitude of an imaging angle of view thereof. The imaging direction of an imaging apparatus can be expressed, for example, by a pan (P) coordinate and a tilt (T) coordinate (hereinafter collectively referred to as PT coordinates) corresponding to the amounts of change in a P direction and a T direction with respect to predetermined reference coordinates. The magnitude of the imaging angle of view can be expressed by a zoom magnification (hereinafter also referred to as a zoom value). In the present exemplary embodiment, the imaging apparatus 102 (the first imaging apparatus) is set to an imaging angle of view wider than that of the imaging apparatus 101 (the second imaging apparatus). In the following description of the imaging apparatuses 101 and 102, the imaging apparatus 102 (the first imaging apparatus) will sometimes be referred to as a wide angle-of-view imaging apparatus 102 and the imaging apparatus 101 (the second imaging apparatus) will sometimes be referred to as a narrow angle-of-view imaging apparatus 101 in order to particularly clarify the difference in the imaging angle of view. In addition, a first image acquired by the wide angle-of-view imaging apparatus 102 will be referred to as a wide angle-of-view image, and a second image acquired by the narrow angle-of-view imaging apparatus 101 will be referred to as a narrow angle-of-view image. The imaging apparatuses 101 and 102 each output the image data generated by image capturing to the information processing apparatus 103 via the network or a video interface. In the following description, image data will simply be referred to as an image unless a specific description is necessary.

The narrow angle-of-view imaging apparatus 101 includes an image acquisition unit 104, an image output unit 106, and a PTZ control unit 108. The image acquisition unit 104 captures a moving image to acquire an image frame by frame, and outputs the frame-by-frame images to the image output unit 106. The image output unit 106 outputs the frame-by-frame images to the information processing apparatus 103 via the network. The PTZ control unit 108 performs PTZ driving based on PTZ control values generated by the information processing apparatus 103 and transmitted via the network as will be described below.

Similarly, the wide angle-of-view imaging apparatus 102 includes an image acquisition unit 105, an image output unit 107, and a PTZ control unit 109. The image acquisition unit 105 captures a moving image to acquire an image frame by frame, and outputs the frame-by-frame images to the image output unit 107. The image output unit 107 outputs the frame-by-frame images to the information processing apparatus 103 via the network. The PTZ control unit 109 performs PTZ driving based on PTZ control values transmitted from the information processing apparatus 103 via the network as will be described below.

In the automatic imaging system 100 according to the present exemplary embodiment, the narrow angle-of-view imaging apparatus 101 and the wide angle-of-view imaging apparatus 102 are calibrated in advance by a user such as a system administrator in order to associate the respective imaging ranges with each other. The PT coordinate values and the zoom value expressing the imaging range of the imaging apparatus 101 and the PT coordinate values and the zoom value expressing the imaging range of the imaging apparatus 102, which are associated in the prior calibration, are acquired as calibration information. The calibration information may be stored in a not-illustrated recording unit. In a case where the calibration is performed each time automatic tracking is started, the calibration information may be acquired each time.

The information processing apparatus 103 has a function of generating PTZ control commands and transmitting the PTZ control commands to the respective imaging apparatuses 101 and 102. The PTZ control commands are transmitted to the imaging apparatuses 101 and 102 as the PTZ control values for giving instructions about the PT coordinates and the zoom magnification. In other words, in the present exemplary embodiment, the imaging apparatuses 101 and 102 perform PTZ driving based on the PTZ control values provided from the information processing apparatus 103 via the network. The information processing apparatus 103 is also capable of imaging control, such as imaging start control and imaging end control, on each of the imaging apparatuses 101 and 102.

The information processing apparatus 103 detects a human body as a subject to be tracked, from a captured image of the imaging apparatus 101, calculates human body coordinates within the angle of view of the imaging apparatus 101, and generates PTZ control values for automatically tracking the human body based on a change in the human body coordinates (a change in the position of the human body). The information processing apparatus 103 then transmits the PTZ control values to the imaging apparatus 101. Similarly, the information processing apparatus 103 detects the human body to be tracked, from a captured image of the imaging apparatus 102, calculates human body coordinates within the angle of view of the imaging apparatus 102, and generates PTZ control values for automatically tracking the human body based on a change in the human body coordinates (a change in the position of the human body, i.e., an amount of movement of the human body). The information processing apparatus 103 then transmits the PTZ control values to the imaging apparatus 102.

The information processing apparatus 103 also has a function of generating a conversion table of association information for associating the imaging range of the narrow angle-of-view imaging apparatus 101 with that of the wide angle-of-view imaging apparatus 102, based on the calibration information from the calibration performed in advance. The information processing apparatus 103 further has a function of adjusting, if the narrow angle-of-view imaging apparatus 101 has lost track of the human body as the tracking target, the imaging range of the narrow angle-of-view imaging apparatus 101 to restore the tracking based on the human body coordinates being tracked by the wide angle-of-view imaging apparatus 102 and the conversion table. More specifically, if the narrow angle-of-view imaging apparatus 101 has lost track of the human body, the information processing apparatus 103 converts the human body coordinates being tracked by the wide angle-of-view imaging apparatus 102 into human body coordinates corresponding to the imaging range of the imaging apparatus 101, based on the conversion table of association information. The information processing apparatus 103 then calculates the PTZ control values based on the amount of movement of the human body calculated using the human body coordinates after the conversion, and performs PTZ control on the narrow angle-of-view imaging apparatus 101 to restore the tracking.

The information processing apparatus 103 also has an error determination function of determining whether there is a calibration error in a case where the narrow angle-of-view imaging apparatus 101 has lost track of the human body as the tracking target and the wide angle-of-view imaging apparatus 102 is successfully tracking the human body. Details thereof will be described below. In this case, the information processing apparatus 103 determines whether a change in the position of the subject at the narrow angle-of-view imaging apparatus 101 having lost track of the subject as the tracking subject and a change in the position of the subject at the wide angle-of-view imaging apparatus 102 tracking the subject satisfy a predetermined condition. If the predetermined condition is determined to be satisfied, the information processing apparatus 103 determines that there is a calibration error and notifies the user of the error. The information processing apparatus 103 according to the present exemplary embodiment can make the determination not only in a case where there is an error in the calibration performed in advance but also in a case where an error occurs after the calibration due to changes over time, and notify the user of the calibration error. The information processing apparatus 103 notifies the user by superimposing information (error notification information) indicating the calibration error on the images acquired from the imaging apparatus 101 and 102 and displaying the images on the monitor apparatus 125.

As a configuration for implementing the foregoing human body tracking processing, the calibration error determination, and the determination result notification processing, the information processing apparatus 103 includes functional units ranging from an external image acquisition unit 110 to a control value notification unit 123 and a video output unit 124.

The external image acquisition unit 110 acquires the frame-by-frame images transmitted from the image output units 106 and 107 via the network, and outputs the frame-by-frame images to a human body detection unit 111 and an error notification unit 121.

The human body detection unit 111 performs human body detection processing for detecting human body regions from the frame-by-frame images input from the external image acquisition unit 110. More specifically, the human body detection unit 111 detects human body regions as subjects from the image captured by the wide angle-of-view imaging apparatus 102, and also detects human body regions from the image captured by the narrow angle-of-view imaging apparatus 101. In the human body detection processing, any method capable of detecting a human body region from an image can be used. Examples thereof include a template matching method and a semantic segmentation method. Since the template matching method and the semantic segmentation method are known techniques, a detailed description thereof will be omitted. The human body detection unit 111 outputs information (human body information) indicating the human body regions detected from the frame-by-frame images to a target selection unit 112. In the present exemplary embodiment, the human body information includes at least coordinates indicating the position of each human body region in the images.

The target selection unit 112 selects a tracking target based on the human body information input from the human body detection unit 111. If a human body has already been selected as the tracking target in the previous frame images, the target selection unit 112 simply selects this tracking target. Any selection method that can select a specific human body region from among a plurality of human body regions in an image can be used as the method for selecting the tracking target. For example, a human body region closest to the center of the image may be selected as the tracking target. The target selection unit 112 outputs the human body information about the human body region selected as the tracking target in each frame image captured by the imaging apparatuses 101 and 102 to a tracking processing unit 113.

The tracking processing unit 113 performs human body tracking processing on each of the wide and narrow angle-of-view images, using the human body information about the tracking target input from the target selection unit 112. If the human body tracking processing has not been performed before, the tracking processing unit 113 starts the human body tracking processing with the tracking target selected by the target selection unit 112 as an input. On the other hand, if the human body tracking processing has already been performed on the tracking target selected by the target selection unit 112, the tracking processing unit 113 performs the human body tracking processing to continue tracking the selected tracking target. Any human body tracking method can be used as long as the tracking processing is based on the position information about the tracking target in the previous frame and the position information about the tracking target selected by the target selection unit 112 in the current frame. For example, if a position predicted from a movement history of the tracking target matches the position of the tracking target selected by the target selection unit 112, that position may be employed as the position of the tracking target. If the human body as the tracking target is successfully tracked, the tracking processing unit 113 outputs coordinate information about the tracking target to a result storage unit 114 and a necessity determination unit 115. On the other hand, if the human body as the tracking target is not successfully tracked, the tracking processing unit 113 outputs information (non-tracking information) indicating the failure of the tracking to the result storage unit 114 and the necessity determination unit 115.

In a case where the coordinate information about the tracking target is input from the tracking processing unit 113, the result storage unit 114 stores the coordinate information as tracking result information. On the other hand, in a case where non-tracking information is input from the tracking processing unit 113, the result storage unit 114 stores the non-tracking information as the tracking result information. In a case where coordinate information after coordinate conversion processing (described below) on the image acquired from the imaging apparatus 101 is input from a coordinate conversion unit 118, the result storage unit 114 stores the coordinate information after the coordinate conversion processing as the tracking result information instead of the non-tracking information. The result storage unit 114 outputs the already stored tracking result information about the previous frame image to a movement amount calculation unit 119.

The necessity determination unit 115 determines whether to perform a coordinate conversion, based on the respective tracking results on the wide and narrow angle-of-view images input from the tracking processing unit 113. In the present exemplary embodiment, the necessity determination unit 115 determines to perform a coordinate conversion if the human body is lost track of in the narrow angle-of-view image acquired from the imaging apparatus 101 and is successfully tracked in the wide angle-of-view image acquired from the imaging apparatus 102. On the other hand, if the human body is successfully tracked in both the narrow and wide angle-of-view images, the necessity determination unit 115 determines to not perform a coordinate conversion. The necessity determination unit 115 then outputs information indicating the tracking results and the determination result to the coordinate conversion unit 118 and the movement amount calculation unit 119.

If the imaging apparatuses 101 and 102 are calibrated by the user in advance, an information acquisition unit 116 acquires and stores the resulting calibration information. The information acquisition unit 116 outputs the acquired and stored calibration information to a table generation unit 117.

The table generation unit 117 generates the conversion table of association information for associating the imaging range of the narrow angle-of-view imaging apparatus 101 with that of the wide angle-of-view imaging apparatus 102, based on the calibration information acquired by the information acquisition unit 116. More specifically, in the present exemplary embodiment, the table generation unit 117 generates, as the conversion table, a coordinate conversion table for associating coordinate values in the imaging range of the narrow angle-of-view imaging apparatus 101 with those in the imaging range of the wide angle-of-view imaging apparatus 102.

Figure 3A:
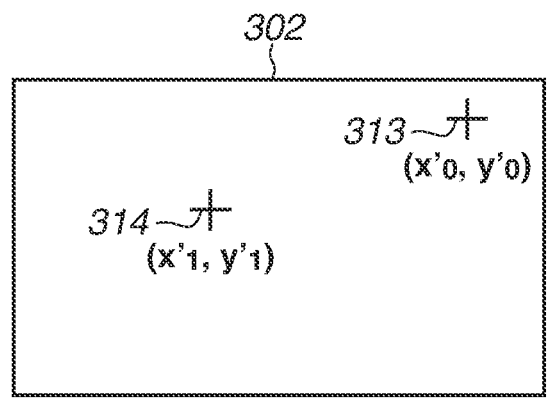
FIGS. 3A and 3B are explanatory diagrams of processing for associating coordinates of imaging ranges.
Figure 3B:
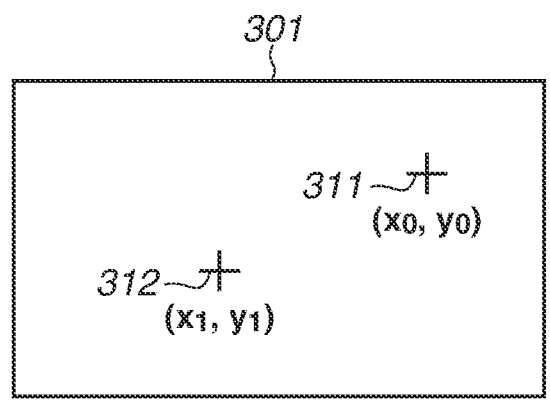

FIGS. 3A and 3B are diagrams illustrating the processing for associating the coordinates in the imaging range of the narrow angle-of-view imaging apparatus 101 with those in the imaging range of the wide angle-of-view imaging apparatus 102. FIG. 3A is a diagram illustrating a narrow angle-of-view image 302 acquired from the imaging range of the imaging apparatus 101. FIG. 3B is a diagram illustrating a wide angle-of-view image 301 acquired from the imaging range of the imaging apparatus 102. A position 311 in the wide angle-of-view image 301 and a position 313 in the narrow angle-of-view image 302 represent positions associated with each other. Similarly, a position 312 in the wide angle-of-view image 301 and a position 314 in the narrow angle-of-view image 302 represent positions associated with each other. In the wide angle-of-view image 301, the position 311 is expressed by coordinates $(x_0, y_0)$ and the position 312 is expressed by coordinates $(x_1, y_1)$. Similarly, in the narrow angle-of-view image 302, the position 313 is expressed by coordinates $(x'_0, y'_0)$ and the position 314 is expressed by coordinates $(x'_1, y'_1)$. The x coordinate represents a coordinate value indicating a horizontal position, and the y coordinate represents a coordinate value indicating a vertical position.

In this example, the table generation unit 117 generates a coordinate conversion table for associating the coordinates of the respective positions with each other. In the example of FIGS. 3A and 3B, the coordinate conversion table associates the respective coordinates, for example, as follows: $(x'_0, y'_0)=T_{(x0,y0)}(x_0, y_0)$, $(x'_1, y'_1)=T_{(x1,y1)}(x_1, y_1)$. $T_{(x0,y0)}$ and $T_{(x1,y1)}$ are association coefficients in the coordinate conversion table. The table generation unit 117 outputs the coordinate conversion table to the coordinate conversion unit 118 as appropriate.

The coordinate conversion unit 118 acquires the coordinate conversion table from the table generation unit 117 in a case where the determination result indicating that a coordinate conversion is to be performed and the tracking results are input from the necessity determination unit 115. The coordinate conversion unit 118 then converts the human body coordinates of the tracking result in the wide angle-of-view image acquired from the imaging apparatus 102 into human body coordinates corresponding to the narrow angle-of-view image acquired from the imaging apparatus 101, based on the coordinate conversion table generated from the calibration information as described above. In other words, the coordinate conversion unit 118 converts the human body coordinates of the tracking result corresponding to the imaging range of the wide angle-of-view imaging apparatus 102 into the coordinates corresponding to the imaging range of the narrow angle-of-view imaging apparatus 101, based on the coordinate conversion table.

Figure 4A:
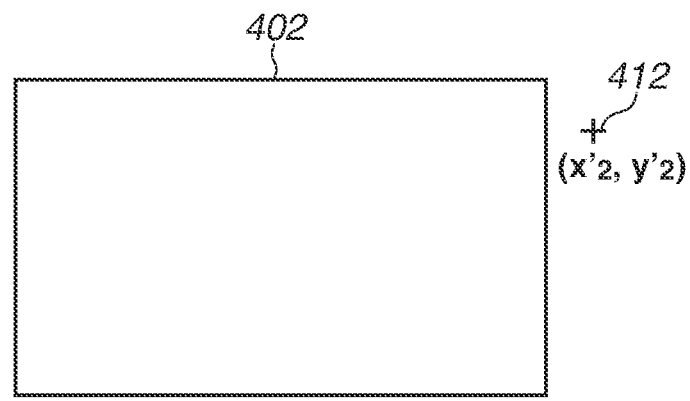
FIGS. 4A and 4B are explanatory diagrams of a coordinate conversion using a coordinate conversion table.
Figure 4B:
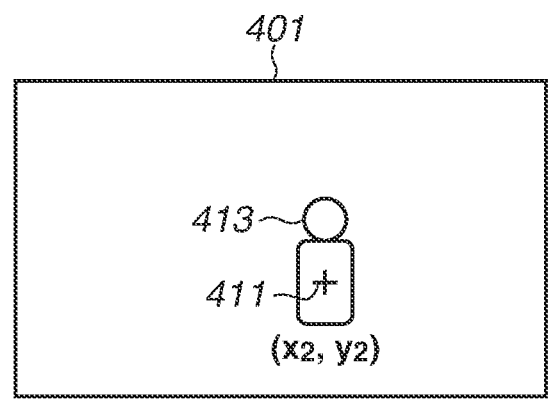

FIGS. 4A and 4B are diagrams illustrating the coordinate conversion processing by the coordinate conversion unit 118. FIG. 4A illustrates a narrow angle-of-view image 402 acquired by the imaging apparatus 101 and illustrates an example of a state where a human body as the tracking target goes out of the imaging range of the imaging apparatus 101 and is lost track of. FIG. 4B illustrates a wide angle-of-view image 401 acquired by the imaging apparatus 102 and illustrates an example of a state where a human body 413 as the tracking target is successfully tracked and a position 411 of the tracking target is within the imaging range of the imaging apparatus 102. Suppose that the position 411 of the human body 413 in the wide angle-of-view image 401 is at coordinates $(x_2, y_2)$. On the other hand, the coordinate values of the human body are not acquired by the narrow angle-of-view imaging apparatus 101 since the human body is outside the imaging range (the angle of view) and lost track of.

The coordinate conversion unit 118 thus converts the coordinates ($x_2$, $y_2$) of the position 411 in the wide angle-of-view image 401 where the human body 413 is successfully tracked into the coordinates corresponding to the imaging range of the narrow angle-of-view imaging apparatus 101, i.e., the coordinates corresponding to the narrow angle-of-view image 402, based on the coordinate conversion table. In FIG. 4A, a position 412 represents the position obtained by the coordinate conversion, where the coordinate values are ($x'_2$, $y'_2$). In other words, the coordinate conversion unit 118 performs the coordinate conversion using the coordinate conversion table to obtain the coordinates ($x'_2$, $y'_2$)=$T_{(x2,y2)}$($x_2$, $y_2$) of the position 412 from the coordinates ($x_2$, $y_2$) of the position 411. The coordinate conversion unit 118 outputs the human body coordinates before and after the coordinate conversion to the result storage unit 114 and the movement amount calculation unit 119.

The movement amount calculation unit 119 calculates the amount of movement of the human body from a change in the position of the subject (the human body) in the wide angle-of-view image 401 acquired from the imaging apparatus 102. The movement amount calculation unit 119 also calculates the amount of movement of the human body from a change in the position of the subject (the human body) in the narrow angle-of-view image 402 acquired from the imaging apparatus 101. In the present exemplary embodiment, the movement amount calculation unit 119 calculates the amounts of movement of the human body as the tracking target in the x direction and the y direction using the tracking result in the previous frame stored in the result storage unit 114, and the tracking result in the current frame input from the coordinate conversion unit 118 or the necessity determination unit 115. If there is no tracking result in the current or previous frame, the movement amount calculation unit 119 outputs a calculation result indicating that the amount of movement is zero.

Figure 5A:
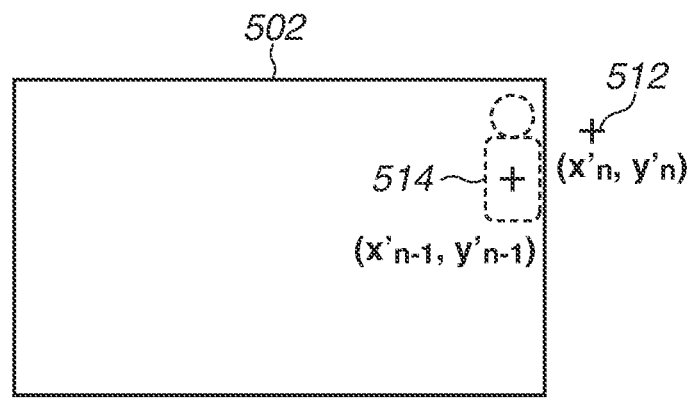
FIGS. 5A and 5B are explanatory diagrams of calculation of amounts of movement.
Figure 5B:
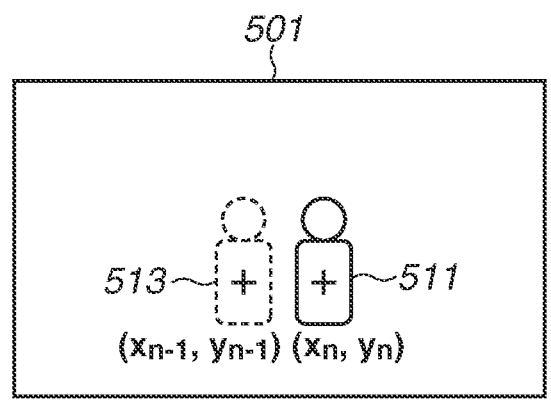

FIGS. 5A and 5B are diagrams illustrating movement amount calculation processing by the movement amount calculation unit 119. FIG. 5A illustrates a narrow angle-of-view image 502 acquired from the imaging apparatus 101, and illustrates an example of a state where the tracking target goes out of the imaging range and is lost track of. FIG. 5B illustrates a wide angle-of-view image 501 acquired from the imaging apparatus 102. A position 511 in FIG. 5B represents the position of the tracking target (the human body) being tracked within the imaging range. A position 513 in FIG. 5B represents the position in the previous frame corresponding to the position 511.

A position 512 in FIG. 5A represents the position obtained by converting the coordinates of the position 511 successfully being tracked in the wide angle-of-view image 501 into the coordinates corresponding to the imaging range of the narrow angle-of-view imaging apparatus 101 based on the coordinate conversion table since the tracking target is lost track of. A position 514 in FIG. 5A represents the position of the tracking target in the previous frame. In this example, suppose that the coordinates of the position 511 are ($x_n$, $y_n$), the coordinates of the position 513 in the previous frame are ($x_{n-1}$, $y_{n-1}$), the coordinates of the position 512 are ($x'_n$, $y'_n$), and the coordinates of the position 514 in the previous frame are ($x'_{n-1}$, $y'_{n-1}$).

Based on the position 511 in the current frame of the wide angle-of-view image 501 and the position 513 in the previous frame of the wide angle-of-view image 501, the movement amount calculation unit 119 calculates $|x_n-x_{n-1}|$ as the amount of movement in the x direction and $|y_n-y_{n-1}|$ as the amount of movement in the y direction. The movement amount calculation unit 119 similarly calculates $|x'_n-x'_{n-1}|$ as the amount of movement in the x direction and $|y'_n-y'_{n-1}|$ as the amount of movement in the y direction based on the position 512 obtained by the coordinate conversion processing on the current frame of the narrow angle-of-view image 502, and the position 514 in the previous frame corresponding to the position 512. In such a manner, the movement amount calculation unit 119 calculates, for the narrow angle-of-view image 502 where the tracking target is lost track of, the amounts of movement of the tracking target by using the human body coordinates of the position 512 into which the human body coordinates successfully being tracked in the wide angle-of-view image 501 are converted by the coordinate conversion unit 118. The movement amount calculation unit 119 outputs the amounts of movement of the human body (the tracking target) calculated in this manner to an error determination unit 120.

The error determination unit 120 determines whether there is a calibration error, using the amounts of movement calculated from each of the wide and narrow angle-of-view images by the movement amount calculation unit 119 and the information about the tracking results on the respective images stored in the result storage unit 114. The error determination unit 120 according to the present exemplary embodiment determines that there is a calibration error if the amount of movement of the tracking target successfully being tracked in the wide angle-of-view image is small and the amount of movement calculated using the coordinates acquired by the coordinate conversion due to the target being lost track of in the narrow angle-of-view image is large. In the present exemplary embodiment, the error determination unit 120 determines whether the amount of movement in the wide angle-of-view image acquired from the imaging apparatus 102 is small and whether the amount of movement in the narrow angle-of-view image acquired from the imaging apparatus 101 is large, by comparison with a threshold set for the amount of movement in each of the images.

In the present exemplary embodiment, the threshold is a given value and is expressed with $\delta$. Error determination processing by the error determination unit 120 will be described with reference to FIGS. 5A and 5B. The amounts of movement of the human body as the tracking target in the wide angle-of-view image 501 illustrated in FIG. 5B are expressed by $|x_n-x_{n-1}|$ and $|y_n-y_{n-1}|$ which are movement differences between the position 511 and the position 513. The amounts of movement of the human body as the tracking target in the narrow angle-of-view image 502 illustrated in FIG. 5A are expressed by $|x'_n-x'_{n-1}|$ and $|y'_n-y'_{n-1}|$ which are movement differences between the position 512 obtained by the coordinate conversion and the position 514 in the previous frame corresponding to the position 512. Suppose here that the relationship between the amounts of movement of the tracking target in the wide angle-of-view image 501 and the threshold $\delta$ is $|x_n-x_{n-1}|>\delta$ and $|y_n-y_{n-1}|<\delta$, for example. Suppose also that the relationship between the amounts of movement in the narrow angle-of-view image 502 and the threshold $\delta$ is $|x'_n-x'_{n-1}|>\delta$ and $\delta y'_n-y'_{n-1}|>\delta$.

A comparison in the amounts of movement (the movement differences) between the wide and narrow angle-of-view images 501 and 502 indicates that the amount of movement in the x direction is greater than the threshold $\delta$ in both the wide and narrow angle-of-view images 501 and 502, whereas the amount of movement in the y direction is smaller than the threshold δ in the wide angle-of-view image 501 and greater than the threshold δ in the narrow angle-of-view image 502. In such a case, the error determination unit 120 determines that there is a calibration error in the y direction. If the amount of movement in the y direction is greater than the threshold δ in both the wide and narrow angle-of-view images 501 and 502, whereas the amount of movement in the x direction is smaller than the threshold δ in the wide angle-of-view image 501 and greater than the threshold δ in the narrow angle-of-view image 502, the error determination unit 120 determines that there is a calibration error in the x direction.

In other words, the error determination unit 120 determines that there is a calibration error if the amount of movement of the tracking target in one of the x and y directions is less than or equal to a threshold in the wide angle-of-view image and the amount of movement of the tracking target in the direction where the amount of movement is less than or equal to the threshold in the wide angle-of-view image 501 is greater than or equal to the threshold in the narrow angle-of-view image. The error determination unit 120 performs such error determination processing, and outputs the determination result and the amounts of movement (the movement differences) of the tracking target in each of the wide and narrow angle-of-view images to the error notification unit 121.

If the error notification unit 121 receives from the error determination unit 120 the determination result indicating a calibration error, the error notification unit 121 superimposes error notification information indicating the calibration error, on the images input from the external image acquisition unit 110. The error notification unit 121 then outputs the images on which the error notification information is superimposed, to the video output unit 124.

The video output unit 124 outputs the images on which the error notification information is superimposed, to the monitor apparatus 125.

The monitor apparatus 125 thus displays video images obtained by superimposing the error notification information on the images acquired from the imaging apparatuses 101 and 102. This enables the user viewing the display on the monitor apparatus 125 to recognize the calibration error. In the present exemplary embodiment, the user is notified by the error notification information superimposed on the images acquired from the imaging apparatuses 101 and 102, but any notification method can be used. For example, the error notification information may be output as a log.

A control value calculation unit 122 calculates PTZ control values for the wide angle-of-view imaging apparatus 102 based on the amounts of movement of the tracking target calculated from the wide angle-of-view image. The control value calculation unit 122 also calculates PTZ control values for the narrow angle-of-view imaging apparatus 101 based on the amounts of movement of the tracking target calculated from the narrow angle-of-view image. As the method for calculating the PTZ control values, any method capable of controlling the human body as the tracking target to be, for example, near the center of the angle of view in the respective current frame images can be used. Examples thereof include directly specifying the PT coordinates and the zoom value, and specifying the driving speeds in the P and T directions. Further, a method that does not perform PTZ control if the tracking target is in a predetermined region within the angle of view can be used. The control value calculation unit 122 outputs the calculated PTZ control values to the control value notification unit 123.

The control value notification unit 123 outputs the PTZ control values for the narrow angle-of-view imaging apparatus 101 input from the control value calculation unit 122 to the imaging apparatus 101 via the network. The control value notification unit 123 similarly outputs the PTZ control values for the wide angle-of-view imaging apparatus 102 to the imaging apparatus 102. As a result, the imaging apparatuses 101 and 102 each perform PTZ control.

If the error determination unit 120 determines that there is a calibration error, the information processing apparatus 103 may perform processing for correcting the calibration error. In such a case, the information processing apparatus 103 calculates PTZ control values for correcting the calibration error, using the control value calculation unit 122 based on the amounts of movement calculated by the movement amount calculation unit 119. More specifically, the information processing apparatus 103 corrects the coordinates after the foregoing coordinate conversion so that the amount of movement (the movement difference) at the narrow angle-of-view imaging apparatus 101 is zero in the foregoing direction where the amount of movement (the movement difference) at the wide angle-of-view imaging apparatus 102 is less than or equal to the threshold. This enables the narrow angle-of-view imaging apparatus 101 to perform PTZ control based on the PTZ control values for correcting the calibration error. Moreover, after the PTZ control that corrects the calibration error, the information processing apparatus 103 may perform the calibration error determination again using processing similar to the foregoing processing, for example. If the result of the second calibration error determination indicates no calibration error, the information processing apparatus 103 updates the coordinate conversion table stored in the table generation unit 117, based on the PTZ control values used in correcting the calibration error. The updated coordinate conversion table stored in the table generation unit 117 is the table after the calibration error correction. The calibration error correction method is not limited to such an example.

A processing procedure performed by the automatic imaging system 100 according to the present exemplary embodiment will be described with reference to the flowchart of FIG. 2. When a not-illustrated activation button of the automatic imaging system 100 is operated by the user, the automatic imaging system 100 is activated and the information processing apparatus 103 starts the processing of the flowchart of FIG. 2.

In step S201, upon activation of the automatic imaging system 100, the information acquisition unit 116 of the information processing apparatus 103 acquires the calibration information that is acquired by the user performing a calibration in advance and stored, for example, in the not-illustrated recording unit. In step S201, the user may perform a calibration and the information acquisition unit 116 may acquire the resulting calibration information.

In step S202, the table generation unit 117 generates the coordinate conversion table for associating the coordinates in the respective imaging ranges of the imaging apparatuses 101 and 102 with each other, based on the calibration information acquired by the information acquisition unit 116.

In step S203, the image acquisition unit 104 of the imaging apparatus 101 acquires an image (a narrow angle-of-view image) by image capturing, and outputs the image to the image output unit 106. Similarly, the image acquisition unit 105 of the imaging apparatus 102 acquires an image (a wide angle-of-view image) by image capturing, and outputs the image to the image output unit 107.

In step S204, the external image acquisition unit 110 of the information processing apparatus 103 acquires the images output from the image output unit 106 of the imaging apparatus 101 and the image output unit 107 of the imaging apparatus 102, and outputs the images to the human body detection unit 111.

In step S205, the human body detection unit 111 performs the human body detection processing on each of the images input from the external image acquisition unit 110. The human body detection unit 111 outputs information about the detected human bodies to the target selection unit 112.

In step S206, the target selection unit 112 selects the human body as the tracking target in each of the narrow and wide angle-of-view images, based on the result of the human body detection processing on each of the images by the human body detection unit 111. At this time, the human bodies to be selected in the narrow angle-of-view image and the wide angle-of-view image are the human body of the same person. In other words, the same person is selected as the tracking targets in the narrow angle-of-view image and the wide angle-of-view image. If the tracking target has already been selected, the target selection unit 112 does not reselect the tracking target. The target selection unit 112 outputs the results of the human body detection processing by the human body detection unit 111 and the tracking target selection result to the tracking processing unit 113.

In step S207, the tracking processing unit 113 performs the human body tracking processing on each of the narrow and wide angle-of-view images based on the human body detection results and the selected tracking target information input from the target selection unit 112.

In step S208, the result storage unit 114 stores the results of the human body tracking processing by the tracking processing unit 113. The results of the human body tracking processing by the tracking processing unit 113 are also transmitted to the necessity determination unit 115.

In step S209, the necessity determination unit 115 determines whether the tracking is successfully performed in each of the narrow and wide angle-of-view images based on the tracking results on the respective images input from the tracking processing unit 113. Based on this determination result, the necessity determination unit 115 further determines whether to perform a coordinate conversion using the coordinate conversion unit 118. In the present exemplary embodiment, the necessity determination unit 115 determines to perform a coordinate conversion in step S209 if the human body as the tracking target is lost track of and no longer able to be tracked in the narrow angle-of-view image acquired from the imaging apparatus 101 but is successfully tracked in the wide angle-of-view image acquired from the imaging apparatus 102. In other words, if the human body is successfully tracked in both the narrow and wide angle-of-view images, the necessity determination unit 115 determines to not perform a coordinate conversion. If the necessity determination unit 115 determines to not perform a coordinate conversion (NO in step S209), the processing proceeds to step S214. On the other hand, if the necessity determination unit 115 determines to perform a coordinate conversion (YES in step S209), the processing proceeds to step S210. Although omitted in the flowchart of FIG. 2, the processing proceeds to step S219 if the human body as the tracking target is lost track of and unable to be tracked in not only the narrow angle-of-view image but also the wide angle-of-view image.

In step S210, the coordinate conversion unit 118 converts the coordinates of the human body as the tracking target in the wide angle-of-view image where the human body is successfully tracked into human body coordinates corresponding to the narrow angle-of-view image where the human body is lost track of, i.e., the imaging range of the imaging apparatus 101, based on the coordinate conversion table. For that purpose, in step S210, the coordinate conversion unit 118 first acquires the coordinate conversion table from the table generation unit 117 when the determination result indicating that a coordinate conversion is to be performed is input from the necessity determination unit 115. Next, the coordinate conversion unit 118 converts the human body coordinates in the tracking result on the wide angle-of-view image input via the necessity determination unit 115 into the human body coordinates corresponding to the imaging range of the narrow angle-of-view imaging apparatus 101, based on the coordinate conversion table. The coordinate conversion unit 118 then outputs the human body coordinates after the coordinate conversion processing to the result storage unit 114 and the movement amount calculation unit 119.

In step S211, the movement amount calculation unit 119 calculates, for each of the narrow and wide angle-of-view images, a change in the position of the tracking subject, i.e., the amounts of movement (the movement differences) of the tracking subject between the previous and current frames. More specifically, for each of the narrow and wide angle-of-view images, the movement amount calculation unit 119 calculates, as the amounts of movement, differences between the position of the tracking target in the previous frame stored in the result storage unit 114 and the position of the tracking target in the current frame input from the necessity determination unit 115 or the coordinate conversion unit 118. The movement amount calculation unit 119 outputs information about the amounts of movement calculated in step S211 to the error determination unit 120.

In step S212, the error determination unit 120 determines whether there is a calibration error, using the amounts of movement of the human body in each of the narrow and wide angle-of-view images calculated by the movement amount calculation unit 119. The error determination unit 120 determines that there is a calibration error if the tracking is successfully performed and the amount of movement of the tracking target is small in the wide angle-of-view image, whereas the tracking target is lost track of and the amount of movement calculated based on the coordinates after the conversion is large in the narrow angle-of-view image. More specifically, the error determination unit 120 determines that there is a calibration error if the amount of movement of the tracking target in one of the x and y directions is less than or equal to the threshold in the wide angle-of-view image and the amount of movement in the direction where the amount of movement of the tracking target is less than or equal to the threshold in the wide angle-of-view image is greater than or equal to the threshold in the narrow angle-of-view image. If the error determination unit 120 determines that there is a calibration error (YES in step S212), the processing proceeds to step S213. On the other hand, if the error determination unit 120 determines that there is no calibration error (NO in step S212), the processing proceeds to step S215.

In step S213, the error notification unit 121 superimposes the error notification information indicating the calibration error, on the images input from the external image acquisition unit 110. The processing then proceeds to step S215.

In a case where the processing proceeds from S209 to step S214, the movement amount calculation unit 119 calculates the movement differences (the amounts of movement) of the tracking target based on the previous and current frames of each of the narrow and wide angle-of-view images. In this case, the coordinate conversion unit 118 does not perform a coordinate conversion as in step S210 since the necessity determination unit 115 determines to not perform a coordinate conversion. The movement amount calculation unit 119 thus calculates, for each of the narrow and wide angle-of-view images, differences between the position of the tracking target in the previous frame stored in the result storage unit 114 and the position of the tracking target in the current frame input via the necessity determination unit 115, as the amounts of movement.

In step S215, the control value calculation unit 122 calculates the PTZ control values for the narrow angle-of-view imaging apparatus 101 and the PTZ control values for the wide angle-of-view imaging apparatus 102 based on the amounts of movement calculated by the movement amount calculation unit 119 in the foregoing step S211 or S214.

In step S216, the control value notification unit 123 outputs the PTZ control values calculated for the narrow angle-of-view imaging apparatus 101 to the imaging apparatus 101, and outputs the PTZ control values calculated for the wide angle-of-view imaging apparatus 102 to the imaging apparatus 102.

In step S217, the PTZ control unit 108 of the imaging apparatus 101 and the PTZ control unit 109 of the imaging apparatus 102 perform PTZ control based on the respective PTZ control values transmitted from the information processing apparatus 103.

In step S218, the video output unit 124 displays the images input from the external image acquisition unit 110 on the monitor apparatus 125. If the error notification information is input from the error notification unit 121, the video output unit 124 displays the images on which the error notification information is superimposed, on the monitor apparatus 125.

In step S219, the information processing apparatus 103 determines whether a not-illustrated automatic imaging system stop button is operated by the user to give an instruction to stop the operation of the automatic imaging system 100. If the instruction to stop the operation of the automatic imaging system 100 is determined to be given (YES in step S219), the information processing apparatus 103 stops the operation of the automatic imaging system 100. Then, the processing of the flowchart of FIG. 2 ends. On the other hand, if the instruction to stop the operation of the automatic imaging system 100 is not given (NO in step S219), the processing returns to step S201.

As described above, the automatic imaging system 100 according to the present exemplary embodiment includes two or more imaging apparatuses of which the imaging ranges are calibrated, and determines whether there is an error in the calibration when restoring the tracking of the tracking target that one of the imaging apparatuses has lost track of. In the present exemplary embodiment, the automatic imaging system 100 determines that there is a calibration error if the tracking target is successfully tracked and the amount of movement thereof is small in the wide angle-of-view image, whereas the tracking target is lost track of and the amount of movement calculated based on the coordinates after the conversion is large in the narrow angle-of-view image. If determining that there is a calibration error, the automatic imaging system 100 can notify the user of the error.

Modified Example

In the foregoing description, the PTZ control is performed on each of the imaging apparatuses 101 and 102 after the calibration error determination. As a modified example of the present exemplary embodiment, the information processing apparatus 103 may make the calibration error determination after the PTZ control or in parallel with the PTZ control. For example, if the subject as the tracking target is successfully tracked in the wide angle-of-view image but lost track of in the narrow angle-of-view image, the information processing apparatus 103 performs the PTZ control on the narrow angle-of-view imaging apparatus 101 to change the imaging range, based on a change in the position of the subject in the wide angle-of-view image and the coordinate conversion table. At this time, if the change in the imaging range of the narrow angle-of-view imaging apparatus 101 and the change in the position (the amount of movement) of the subject in the wide angle-of-view image satisfy a predetermined condition, the information processing apparatus 103 determines that there is a calibration error. The predetermined condition in the present modified example is that the change in the position (the amount of movement) of the subject in the wide angle-of-view image is less than or equal to a threshold and the change in the imaging range of the narrow angle-of-view imaging apparatus 101 is greater than or equal to the threshold. If such a condition is satisfied, the information processing apparatus 103 determines that there is a calibration error. Also in the present modified example, the information processing apparatus 103 determines that there is a calibration error if the amount of movement of the tracking target in one of the x and y directions is less than or equal to the threshold in the wide angle-of-view image and the change in the imaging range of the narrow angle-of-view imaging apparatus 102 in the direction where the amount of movement is less than or equal to the threshold in the wide angle-of-view image is greater than or equal to the threshold. The change in the imaging range according to the present modified example refers to a change in the imaging range in a case where the PTZ control is performed based on the coordinates after the foregoing coordinate conversion, which has a corresponding relationship with a change in the position of the subject in a case where the foregoing coordinate conversion processing is performed. The threshold used for the comparison with the change in the imaging range of the narrow angle-of-view imaging apparatus 101 can be similar to that used in the foregoing exemplary embodiment. In such a manner, the calibration error determination can be made also in the present modified example.

Figure 6:
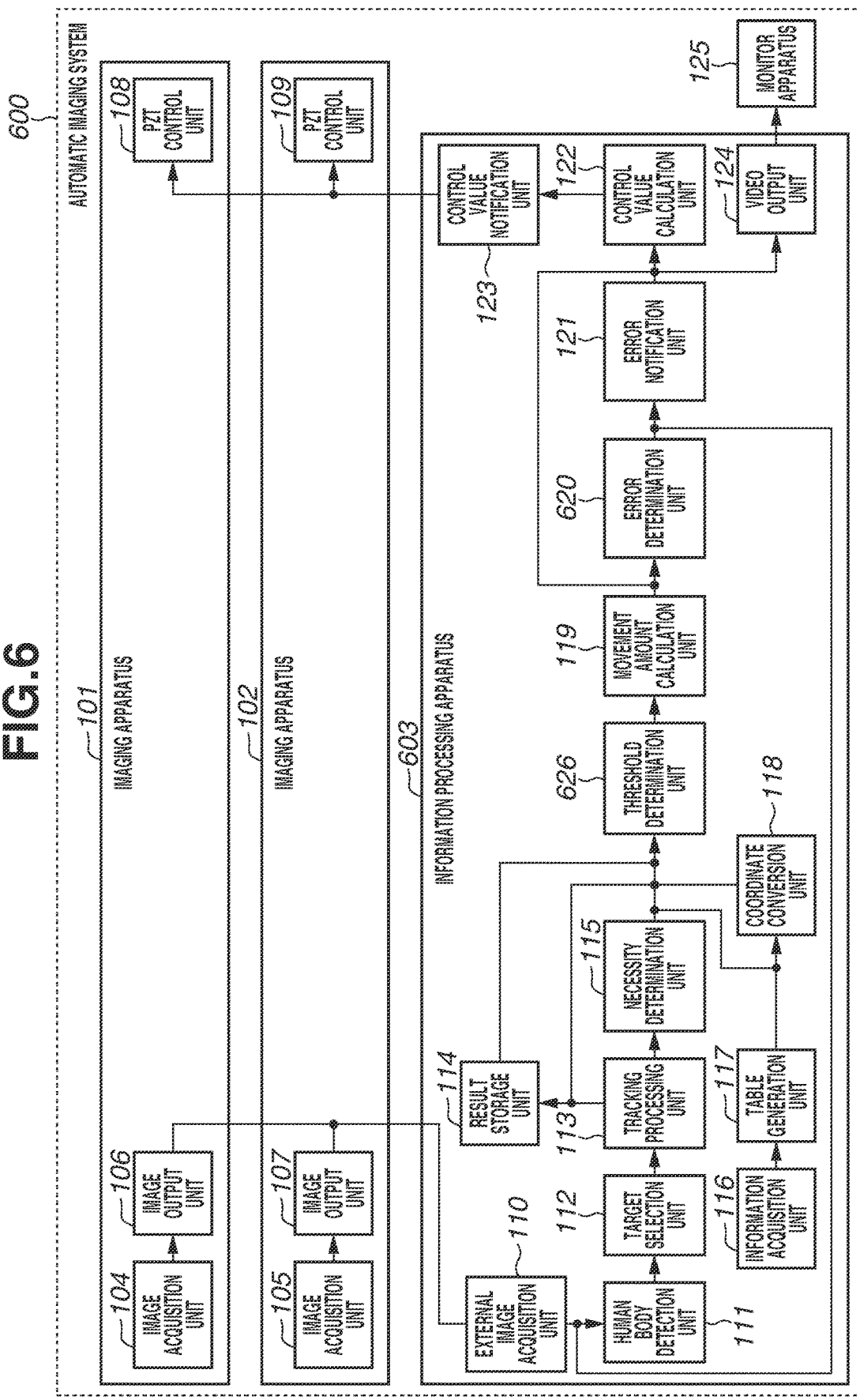
FIG. 6 is a block diagram of an automatic imaging system according to a second exemplary embodiment.
Figure 7:
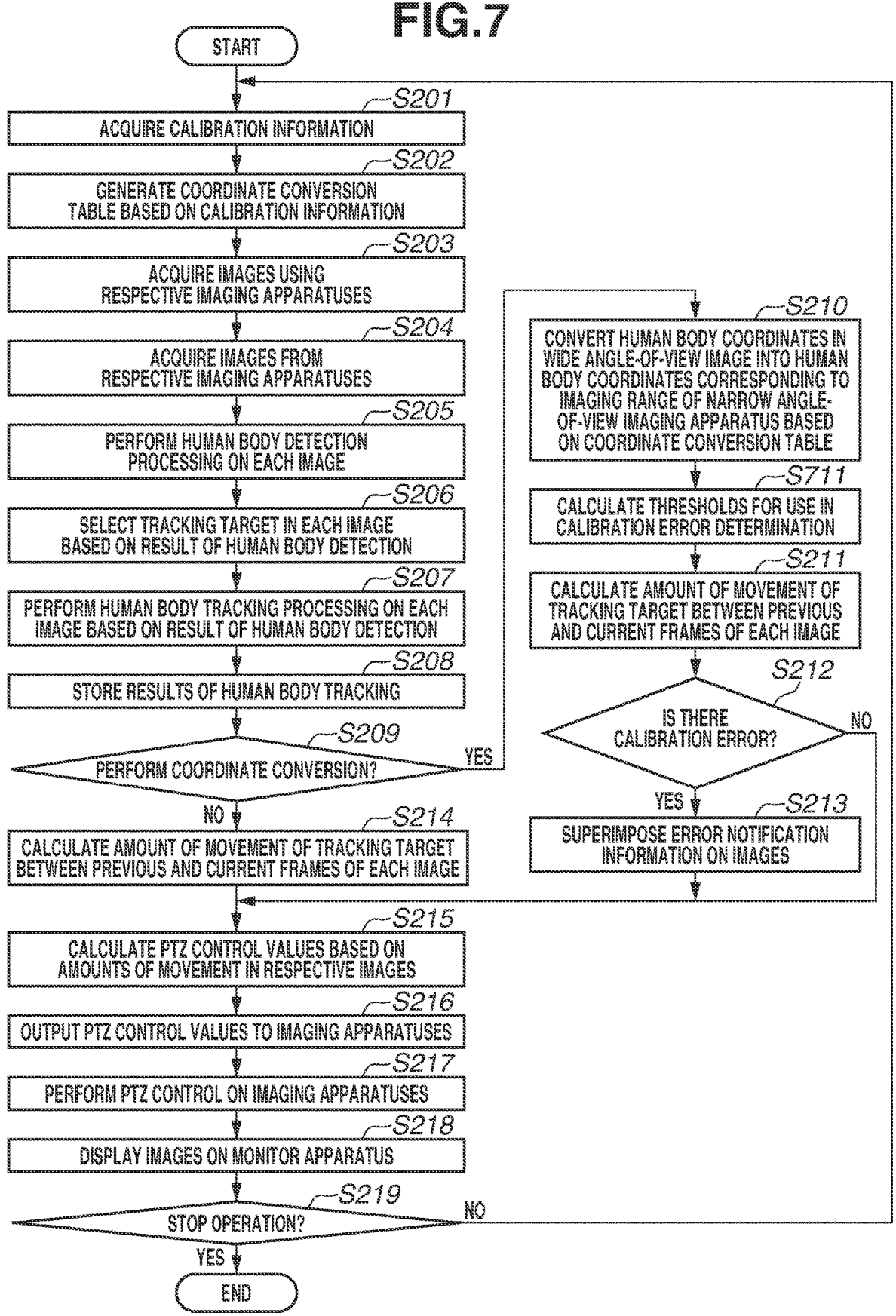
FIG. 7 is a flowchart illustrating a procedure for automatic imaging processing according to the second exemplary embodiment.

FIG. 6 is a diagram illustrating a functional configuration of an automatic imaging system 600 including an information processing apparatus 603 according to a second exemplary embodiment. FIG. 7 is a flowchart illustrating a processing procedure performed by the automatic imaging system 600 according to the present exemplary embodiment. Similar functional units and processing steps of the automatic imaging system 600 according to the present exemplary embodiment to those of the automatic imaging system 100 according to the first exemplary embodiment are denoted by the same reference numerals as in the first exemplary embodiment. A description thereof will thus be omitted. In the present exemplary embodiment, functional units and processing steps different from those of the automatic imaging system 100 according to the first exemplary embodiment will mainly be described.

In the present exemplary embodiment, the information processing apparatus 603 includes a threshold determination unit 626. An error determination unit 620 according to the present exemplary embodiment determines whether there is a calibration error, using the amounts of movement calculated by the movement amount calculation unit 119 and thresholds determined by the threshold determination unit 626.

The threshold determination unit 626 calculates a moving speed of the human body as the tracking target based on the tracking result in the current frame input from the necessity determination unit 115 or the coordinate conversion unit 118 and the tracking result in the previous frame stored in the result storage unit 114, and determines the thresholds based on the moving speed.

FIG. 8 is a diagram illustrating threshold determination processing by the threshold determination unit 626. FIG. 8 illustrates a table 801 indicating the correspondence between moving speeds and thresholds. The table 801 is used to determine thresholds for the amounts of movement of the human body (the tracking target), which is the subject appearing in an image, in the x direction and the y direction based on the moving speed of the human body. A table 802 indicates the relationship in magnitude between the thresholds in the table 801. In the example of FIG. 8, the moving speed is classified into a reference speed (a normal speed), a low speed (a slow speed), and a high speed (a fast speed). As illustrated in FIG. 8, higher thresholds are set for higher moving speeds since the amounts of movement of the subject increase as the moving speed increases. As illustrated in FIG. 8, lower thresholds are set for lower moving speeds since the amounts of movement of the subject decrease and the swing amount of the imaging apparatus by the PT control decreases as the moving speed decreases.

The threshold determination unit 626 then outputs the thresholds in the x and y directions determined based on the moving speed of the subject (the human body as the tracking target) and the input tracking results in the current and previous frames, to the movement amount calculation unit 119.

While the threshold determination unit 626 determines the thresholds based on the moving speed of the subject, the thresholds may be determined based on the size of the subject as the tracking target, the zoom magnification (the zoom value) of each of the imaging apparatuses 101 and 102, or a sensitivity setting value (a sensitivity parameter) for automatic tracking. For example, the threshold determination unit 626 sets higher thresholds for a larger subject. Alternatively, the threshold determination unit 626 sets higher thresholds for a higher zoom magnification. Alternatively, the threshold determination unit 626 sets lower thresholds for a higher sensitivity setting value for automatic tracking. The sensitivity setting value for automatic tracking corresponds to the PTZ driving speed in the PTZ control, i.e., the PTZ change amount per unit time. The larger the sensitivity setting value is, the faster the PTZ driving speed is. The smaller the sensitivity setting value is, the slower the PTZ driving speed is. For example, if the sensitivity setting value for automatic tracking is small, the threshold determination unit 626 sets high thresholds since the amounts of movement of the subject can be relatively large while the PTZ driving speed is low. On the other hand, if the sensitivity setting value for automatic tracking is large, the threshold determination unit 626 sets low thresholds since the amounts of movement of the subject can be relatively small while the PTZ driving speed is high.

The movement amount calculation unit 119 calculates the amounts of movement of the human body in the x direction and the y direction, similarly to the foregoing first exemplary embodiment. In the present exemplary embodiment, the human body tracking results in the current and previous frames that the movement amount calculation unit 119 uses in calculating the amounts of movement are input via the threshold determination unit 626. The movement amount calculation unit 119 then outputs the amounts of movement of the human body calculated for the respective images and the thresholds determined by the threshold determination unit 626 to the error determination unit 620.

The error determination unit 620 determines whether there is a calibration error, using the amounts of movement of the human body in the respective images input from the movement amount calculation unit 119 and the thresholds determined by the threshold determination unit 626.

Suppose here that the threshold in the x direction determined by the threshold determination unit 626 is $\varepsilon_{x3}$, and the threshold determined by the threshold determination unit 626 in the y direction is $\varepsilon_{y1}$. Referring to the foregoing example of FIGS. 5A and 5B, the amounts of movement of the human body in the wide angle-of-view image 501 are expressed by the movement differences $|x_n-x_{n-1}|$ and $|y_n-y_{n-1}|$ as described above. Similarly, the amounts of movement of the human body in the narrow angle-of-view image 502 are expressed by the movement differences between the position 512 obtained by the coordinate conversion and the position 514 tracked in the previous frame, i.e., $|x'_n-x'_{n-1}|$ and $|y'_n-y'_{n-1}|$ as described above. Suppose in the present exemplary embodiment that the amounts of movement of the human body in the wide angle-of-view image 501 are such that $|x_n-x_{n-1}|>\varepsilon_{x3}$ and $|y_n-y_{n-1}|<\varepsilon_{y1}$, where $\varepsilon_{x3}$ is the threshold in the x direction and $\varepsilon_{y1}$ is the threshold in the y direction. Suppose also that the amounts of movement of the human body in the narrow angle-of-view image 502 are such that $|x'_n-x'_{n-1}|>\varepsilon_{x3}$ and $|y'_n-y'_{n-1}|>\varepsilon_{y1}$. In this case, a comparison in the amounts of movement (the movement differences) between the wide angle-of-view image 501 and the narrow angle-of-view image 502 indicates that the amount of movement in the x direction is greater than the threshold $\varepsilon_{x3}$ in both of the images 501 and 502. On the other hand, the amount of movement in the y direction is less than the threshold $\varepsilon_{y1}$ in the wide angle-of-view image 501 and is greater than the threshold $\varepsilon_{y1}$ in the narrow angle-of-view image 502. The error determination unit 620 thus determines that there is a calibration error in the y direction. The error determination unit 620 then outputs the result of the error determination processing and the amounts of movement (the movement differences) of the tracking target in each of the wide and narrow angle-of-view images 501 and 502 to the error notification unit 121.

A processing procedure performed by the automatic imaging system 600 according to the present exemplary embodiment will be described with reference to the flowchart of FIG. 7. A description of processing steps similar to those in the first exemplary embodiment (processing steps denoted by the same reference numerals as those in the example of FIG. 2) will be omitted, and processing steps different from those in the example of FIG. 2 will be described.

In the present exemplary embodiment, if a coordinate conversion is determined to be performed (YES in step S209), the processing proceeds to step S210. After the processing of step S210 is performed, the processing proceeds to step S711.

In step S711, the threshold determination unit 626 calculates the moving speed of the human body as the tracking target, using the tracking result in the current frame of each of the images input from the necessity determination unit 115 or the coordinate conversion unit 118 and the tracking result in the previous frame of each of the images acquired from the result storage unit 114. The threshold determination unit 626 further determines the thresholds for use in the calibration error determination, based on the calculated moving speed. As described above, the thresholds may be determined based on the size of the subject as the tracking subject, the zoom value (the zoom magnification) of each of the imaging apparatuses 101 and 102, or the sensitivity setting value for automatic tracking. The threshold determination unit 626 outputs the determined thresholds and the input human body tracking results to the movement amount calculation unit 119. In the present exemplary embodiment, after the processing of step S711, the processing proceeds to step S211. The processing of step S211 and the subsequent steps is similar to that described in the foregoing exemplary embodiment. A description thereof will thus be omitted. The processing of step S214 and the subsequent steps is also similar to that described in the foregoing exemplary embodiment. A description thereof will thus be omitted.

As described above, the automatic imaging system 600 according to the present exemplary embodiment determines the thresholds for use in the calibration error determination, based on the moving speed or size of the subject as the tracking target, such as a human body, the zoom magnification, or the sensitivity setting value for automatic tracking. The calibration error determination can thus be performed with high accuracy, adapting to the moving speed, the size, the zoom magnification, or the sensitivity.

The processing for determining the thresholds according to the present exemplary embodiment is also applicable to the foregoing modified example of the first exemplary embodiment.

In each of the foregoing exemplary embodiments, the example where the tracking target is tracked by PTZ control on both the narrow and wide angle-of-view imaging apparatuses 101 and 102 has been described. Alternatively, the tracking may be performed by PTZ control on only the narrow angle-of-view imaging apparatus 101. In such a case, the imaging range of the wide angle-of-view imaging apparatus 102 is a wide range including the imaging range of the narrow angle-of-view imaging apparatus 101, and the subject tracking processing is performed within the wide angle-of-view image acquired by the wide angle-of-view imaging apparatus 102. An example of the wide angle-of-view imaging apparatus 102 used in this case is a bird's-eye view imaging apparatus that captures a bird's-eye view image of the entire area without PTZ control.

In the foregoing exemplary embodiments, the example where the narrow and wide angle-of-view imaging apparatuses 101 and 102 having different angles of view from each other are PTZ-controlled has been described. Alternatively, the two imaging apparatuses 101 and 102 may have the same imaging angle of view. In such a case, the calibration error determination is made by performing similar processing to the foregoing processing if one of the imaging apparatuses 101 and 102 has lost track of the subject and the other is successfully tracking the subject.

The information processing apparatus according to each of the foregoing exemplary embodiments can be implemented by a personal computer connected to the imaging apparatuses 101 and 102. The computer performs the information processing described in each of the foregoing exemplary embodiments, ranging from the human body detection to the generation of the PTZ control values and the video image output. The computer in this case executes a software program code for implementing the information processing according to each of the exemplary embodiments. Although illustration of a hardware configuration thereof is omitted, the computer for implementing the information processing apparatus according to each of the exemplary embodiments includes a central processing unit (CPU), a read-only memory (ROM), a random access memory (RAM), an auxiliary storage device, a display unit, an operation unit, a communication interface (I/F), and a bus. The CPU controls the entire computer using computer programs and data stored in the ROM and the RAM, and performs the foregoing information processing ranging from the human body detection to the generation of the PTZ control values and the video image output. The information processing apparatus according to each of the exemplary embodiments may include one or a plurality of pieces of dedicated hardware different from the CPU, and the dedicated hardware may be configured to perform at least a part of the processing by the CPU. Examples of the dedicated hardware include an application specific integrated circuit (ASIC), a field-programmable gate array (FPGA), and a digital signal processor (DSP). The ROM stores unmodifiable programs. The RAM temporarily stores programs and data supplied from the auxiliary storage device, and data supplied from external apparatuses such as imaging apparatuses via the communication I/F. The auxiliary storage device is for example a hard disk drive (HDD), and stores various types of data including image data and calibration information. The display unit includes a liquid crystal display or a light-emitting diode (LED) display, for example. The display unit displays a graphical user interface (GUI) that is used by the user to operate the information processing apparatus. The operation unit includes a keyboard, a mouse, a joystick, and/or a touch screen, for example. The operation unit receives the user's operations and inputs various instructions to the CPU. The CPU also operates as a display control unit for controlling the display unit and an operation control unit for controlling the operation unit. The communication I/F is used to communicate with apparatuses outside the information processing apparatus. For example, if the information processing apparatus is connected to an external apparatus in a wired manner, a communication cable is connected to the communication I/F. If the information processing apparatus has a function of communicating wirelessly with an external apparatus, the communication I/F includes an antenna. The bus connects the components of the information processing apparatus to transfer information therebetween. In the exemplary embodiments of the disclosure, external apparatuses to be connected to the information processing apparatus include the foregoing imaging apparatuses and other information processing apparatuses. While the display unit and the operation unit are described to be included in the information processing apparatus, the display unit and the operation unit may be independently provided as the foregoing monitor apparatus and an input apparatus, respectively, outside the information processing apparatus.

An exemplary embodiment of the disclosure can be implemented by processing for supplying a program for implementing one or more functions according to the foregoing exemplary embodiments to a system or an apparatus via a network or a storage medium, and causing one or more processors in a computer of the system or the apparatus to read out and execute the program. An exemplary embodiment of the disclosure can also be implemented by a circuit (e.g., an ASIC) for implementing one or more functions according to the foregoing exemplary embodiments.

Each of the foregoing exemplary embodiments is merely an example of an embodiment in carrying out the disclosure, and the technical scope of the disclosure shall not be interpreted limitedly by these exemplary embodiments.

The exemplary embodiments of the disclosure can be implemented in various manners without departing from the technical concept or essential features thereof.

According to the foregoing exemplary embodiments, whether there is an error in a calibration associating imaging ranges can be determined.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-174453, filed Oct. 26, 2021, which is hereby incorporated by reference herein in its entirety.

What is claimed is:

1. An information processing apparatus comprising a computer configured to execute instructions which, when executed by the computer, cause the information processing apparatus to:
    acquire association information for associating a first imaging range of a first imaging apparatus with a second imaging range of a second imaging apparatus configured to change the second imaging range by controlling at least one of pan, tilt, and zoom;
    control the second imaging apparatus based on the association information when a subject detected from a first image captured by the first imaging apparatus is not detected in a second image captured by the second imaging apparatus; and
    determine whether a change in a position of a subject that is derived based on a position of the subject detected from the first image and the association information, and a change in the position of the subject on the first image satisfy a predetermined condition,
    wherein the association information is corrected based on a result of the determination.

2. The information processing apparatus according to claim 1, wherein the instructions cause the information processing apparatus to cause a display to display predetermined notification information based on a result of the determination.

3. The information processing apparatus according to claim 2, wherein the predetermined notification information is notification information indicating that a calibration is not appropriate.

4. The information processing apparatus according to claim 1, wherein the predetermined condition is that the change in the position of the subject in a specific direction is greater than a threshold, the position being derived based on the position of the subject detected from the first image and the association information, and the change in the position of the subject on the first image in the specific direction is less than or equal to the threshold.

5. The information processing apparatus according to claim 4, wherein the specific direction is either a horizontal direction or a vertical direction.

6. The information processing apparatus according to claim 4, wherein the threshold is changed based on a moving speed of the subject, a size of the subject, a zoom magnification of the second imaging apparatus, or a setting value of sensitivity in tracking the subject.

7. An information processing method comprising:
    acquiring association information for associating a first imaging range of a first imaging apparatus with a second imaging range of a second imaging apparatus configured to change the second imaging range by controlling at least one of pan, tilt, and zoom;
    controlling the second imaging apparatus based on the association information when a subject detected from a first image captured by the first imaging apparatus is not detected in a second image captured by the second imaging apparatus; and
    determining whether a change in a position of a subject that is derived based on a position of the subject detected from the first image and the association information, and a change in the position of the subject on the first image satisfy a predetermined condition,
    wherein the association information is corrected based on a result of the determination.

8. A non-transitory computer-readable storage medium storing a program for causing a computer to perform an information processing method, the information processing method comprising:
    acquiring association information for associating a first imaging range of a first imaging apparatus with a second imaging range of a second imaging apparatus configured to change the second imaging range by controlling at least one of pan, tilt, and zoom;
    controlling the second imaging apparatus based on the association information when a subject detected from a first image captured by the first imaging apparatus is not detected in a second image captured by the second imaging apparatus; and
    determining whether a change in a position of the subject that is derived based on a position of the subject detected from the first image and the association information, and a change in the position of the subject on the first image satisfy a predetermined condition, wherein the association information is corrected based on a result of the determination.

\* \* \* \* \*